J. H. WAGENHORST.
VEHICLE WHEEL RIM.
APPLICATION FILED JUNE 10, 1912.

1,136,984.

Patented Apr. 27, 1915.
2 SHEETS—SHEET 1.

Witnesses:
Gerald E. Terwilliger
Edmund Quincy Moses

Inventor
James H. Wagenhorst
By his Attorney
Seward Davis

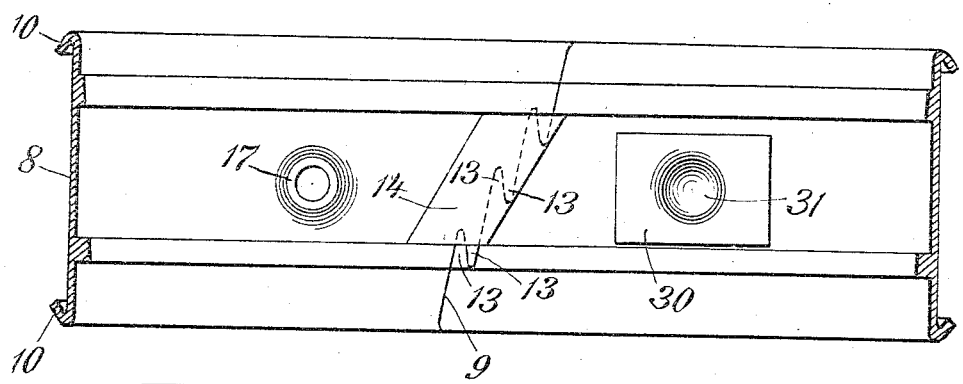
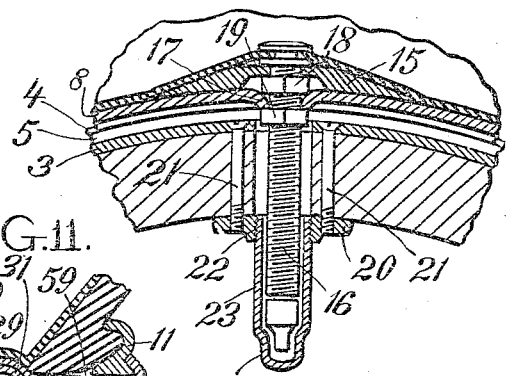
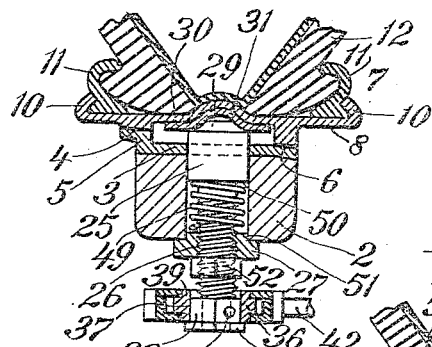
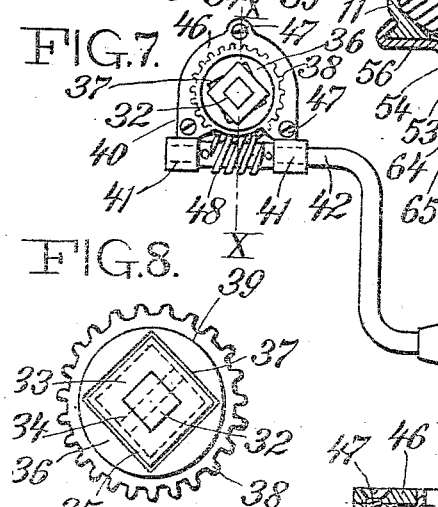
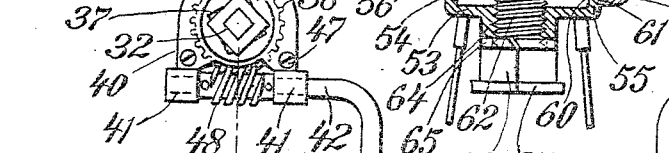
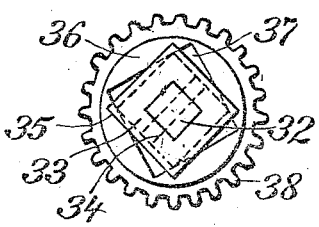

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE WHEEL-RIM.

1,136,984.          Specification of Letters Patent.      Patented Apr. 27, 1915.

Application filed June 10, 1912. Serial No. 702,851.

*To all whom it may concern:*

Be it known that I, JAMES H. WAGENHORST, a citizen of the United States, residing in the city of Akron, county of Summit, and State of Ohio, have invented certain new and useful Improvements in Vehicle Wheel-Rims, of which the following is a specification.

This invention relates to improvements in vehicle wheel rims of the class designed to carry a pneumatic or other resilient tire.

It includes improvements in various details of construction of the means for securing a tire-carrying rim upon a wheel, removably, so that the tire-carrying rim bearing the tire can be taken from the wheel and replaced by a duplicate rim carrying another, preferably already inflated, tire.

My invention also includes an improved form of transversely split tire-carrying rim and certain improvements relating to removable rim structures, the nature of which will fully appear from the following detailed description of my invention.

Figure 1:
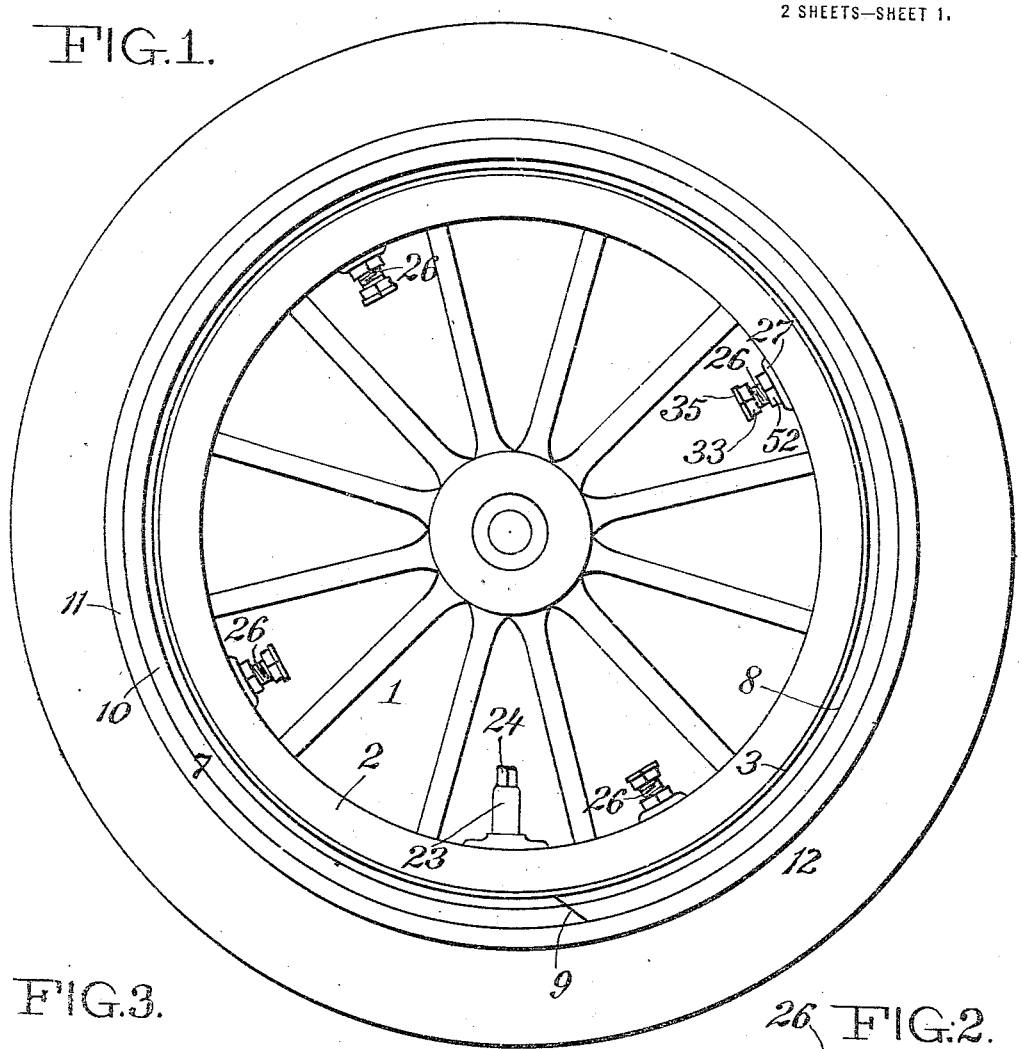
Figures 2, 3:
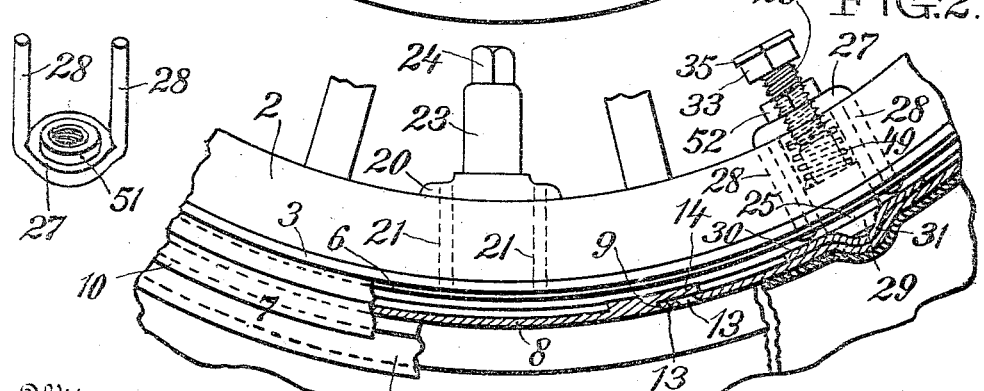

In the accompanying drawings which form a part of this specification, Figure 1 is a side elevation of a vehicle wheel having one form of my improved rim applied thereto; Fig. 2 is a side elevation on an enlarged scale of a part of the rim and wheel felly shown in Fig. 1, a portion of the tire-carrying rim being shown in circumferential section; Fig. 3 is a perspective view of one of the clips used for carrying the radial studs; Fig. 4 is a bottom plan view of a portion of the rim base of the tire-carrying rim removed from the wheel and showing the transverse joint therein; Fig. 5 is a transverse section through the wheel felly and rim showing one of the radial securing bolts and illustrating the socket of an improved form of wrench in cross-section; Fig. 6 is a circumferential section through the wheel felly and rim at the valve-stem; Fig. 7 is an elevation of my improved wrench; Fig. 8 is a bottom plan view of the gear of my improved wrench about to be applied to the shouldered head on the end of one of the radial securing bolts; Fig. 9 is a view similar to Fig. 8 showing the gear of the wrench after application to the bolt-head; Fig. 10 is a section on line X—X of Fig. 7, the wrench being removed from the bolt-head; Fig. 11 is a view similar to Fig. 5 showing a modification of my invention, in which the same is adapted to a wire wheel construction.

Referring to the drawings in detail, the numeral 1 designates a wheel having a felly 2, which, if of wood, is preferably provided with an endless metallic felly band 3 permanently secured thereto by shrinking or otherwise. The felly band 3 is provided with bearing surfaces for engagement with complementary bearing surfaces upon the tire-carrying rim, one of these bearing surfaces, 4, being preferably formed upon a flange 5, so as to have a greater diameter than the bearing surface 6 formed at the opposite edge of the felly band. As will be understood, if the material of the felly 2 is suitable, the bearing surfaces may be formed directly thereon and the separate felly band 3 dispensed with. One form of such a construction is shown in Fig. 11, in which a metallic channel replaces the wooden felly and its felly band. The surfaces 4 and 6 are preferably inclined slightly in the same general direction, although this is not essential.

7 is the tire-carrying rim which may be of any suitable construction. As illustrated in Figs. 1 to 6, inclusive, it comprises a rim base 8 transversely split at 9 and having inwardly hooked flanges 10 at its edges. The flanges 10 engage the endless tire-retaining flanges 11 which retain the beads of the tire 12. As illustrated, the flanges 11 are reversible so that the rim may be used to carry either a tire of clencher form or a straight-sided tire. As shown in Fig. 4, the line of the split 9 is preferably zigzag, so as to provide the interlocking tongues 13, which prevent circumferential expansion of the rim. One end of the rim base may carry a plate 14 which extends slightly under the opposite end of the rim base, this plate preventing the inward movement of the end of the rim base overlapping the same. The general direction of the split in the rim base is preferably at an angle to its edges, the edge of the plate 14 being inclined at a similar angle, as shown in Fig. 4. The split is also preferably formed upon an angle to a radius of the wheel, as shown in Figs. 1 and 2, the beveled end of the rim base carrying the plate 14 being arranged to overhang the other end of the rim base, so that the end carrying the plate 14 cannot be moved radially inward with relation to the opposite end. It will thus be seen that the ends of the rim base are normally locked against radial displacement and against circumferential displacement. The only way in which the ends of the rim can be disengaged is by displacing them laterally until the edge of the plate 14 clears the ends of the tongues 13 on the opposite end of the rim, when such opposite end may be depressed and telescoped beneath the end of the rim carrying the plate. The rim may then be contracted sufficiently to permit the flanges 11 and the tire to be readily removed. The flanges 11 normally prevent the lateral displacement of the ends of the rim base as they are forced firmly beneath the inwardly hooked flanges 10 when the tire is inflated and will be held in such position even when the tire is not inflated by the clip 15 carried by the valve-stem 16. The valve-stem is preferably located near the point where the rim is split, as shown in Figs. 1, 2 and 4. The ends of the split rim base are thus normally firmly held against displacement in any direction and the rim is as strong as an endless rim. The ends may be readily disengaged, however, by deflating the tire and pushing up the valve clip by means of the valve-stem, thus permitting the rim base to be collapsed and the endless flanges and tire to be removed.

In forming an opening through the rim base for the valve-stem, I preferably draw up the metal around the opening into a sort of bell mouth or flange 17, clearly shown in Figs. 4 and 6. This flange may be formed without difficulty during the punching of the opening through the rim base. It serves to facilitate the application of a tire to the rim base by guiding the valve-stem through its opening. It will also receive the edge of the nut 18 which is screwed on the valve-stem to hold the clip in position, thus permitting the clip to seat firmly upon the rim base, although this nut 18 may project slightly below the same. The edge of the flange 17 forms a seat for a nut 19 which may be screwed on the valve-stem to draw the clip down upon the rim base and thus wedge the beads of the tire against the flanges 11 and hold them separated, thus preventing the lateral displacement of the ends of the rim base, as above specified. The valve-stem 16 is preferably inclosed in a valve cap. The latter may screw upon the valve-stem in the usual manner, although I prefer to attach the same to the wheel independently of the valve-stem, so that the rim and tire may be removed from the wheel without removing the valve cap, if desired. In accordance with my invention, I attach a plate 20 to the inner surface of the wheel felly in any suitable manner, as by means of the screws 21 passing through the felly and felly band and screwing into this plate. The plate is provided with a screw-threaded opening 22 therethrough, into which screws the threaded end of the valve cap 23. The valve cap may be provided with a squared end 24, or other suitable means, for turning the same.

The removable tire-carrying rim is preferably locked upon the wheel by means of a plurality of radial studs 25. These studs slide in holes in the felly and are provided with screw-threaded stems 26 which screw through plates 27 secured to the under-surface of the felly. I prefer to form these plates, as shown in Fig. 2, with integral prongs or rods turned up at each end, such rods passing through holes in the felly and the felly band and riveted to the latter. The plates may be easily and cheaply constructed in this form and are very strong, the pressure of the studs being transmitted directly through the plates to the felly band of the wheel. The radial studs 25 have their ends formed to engage the rim in such manner as to prevent lateral and circumferential movement of the rim upon the wheel. I prefer to form the ends of these studs with a concave tapering bearing surface 29 which is adapted to fit the natural roll formed by stamping a rounded depression in the rim base. Such a depression may be stamped with the least injury to the surrounding metal and with the simplest dies and by properly shaping the end of the radial stud an extended bearing surface is obtained. The stud at the same time has a tapered end adapted to guide the rim into alinement with the wheel. I preferably reinforce the sockets formed in the rim for the reception of these radial studs by welding or brazing wear plates 30 to the under-surface of the rim, these being depressed as indicated at 31 to conform to the depressed sockets in the rim. The extreme ends of the radial studs are flattened, while the depressions formed in the rim and wear plates are rounded, so that a slight clearance is left between the flattened ends of the bolts and the bottoms of the sockets in the wear plates. This avoids the necessity of carefully conforming the ends of the bolts to the shape of the sockets and eliminates the danger of the whole pressure of any stud being concentrated upon a small area at the extreme end thereof. For rotating the studs, any suitable means may be employed, but as shown in the drawings, the end of the stem of each stud is squared, as indicated at 32, and a faceted head 33 secured to such squared end in any suitable manner, as by means of a pin 34. I have shown the heads 33 provided at their lower ends with narrow flanges 35 of similar outline to the heads, both the heads and flanges being square, as illustrated in the drawings. The flanges 35 are to retain a wrench applied to the heads for rotating the same. I have devised a novel form of brace wrench especially adapted for use in this connection which I have illustrated in Figs. 5, 7, 8, 9 and 10. The portion of this wrench adapted to engage the heads 33 comprises a socket member or gear 36 having a square opening 37 therethrough of just sufficient size to pass over the flange 35. Fig. 8 shows this member being passed over the flange of the head. After the socket member has passed beyond the flange 35 and is rotated to operate the radial stud, it will turn slightly with relation to the head 33, as it is necessarily slightly larger than the same in order to permit it to pass over the flange 35. By making the flange 35 narrower, however, the difference in size between the socket 37 and the head 33 is not sufficient to permit the socket member 36 to rotate freely about the head, but it will rotate only until the corners of the head 33 engage the walls of the socket 37, as shown in Figs. 7 and 9. Further rotation of the socket member 36 will carry with it the head 33 and consequently rotate the radial stud, as desired. It will be seen that when the socket member is rotated into a position shown in Figs. 5, 7 and 9, it will rest upon portions of the flange 35 and thus be held against accidental displacement from the head 33. This is important where the socket member 36 forms part of a brace wrench, as indicated in Fig. 7, as both hands are required for operating the wrench and some means are necessary to prevent the socket of the wrench from dropping off the head 33. The means for supporting and rotating the socket member 36 of the wrench are as follows: The socket member is provided with teeth 38, the central portion of the socket member projecting above and below the toothed portion of the same to provide cylindrical bosses 39. The lower of these cylindrical bosses is received in a circular opening formed in a casing 40, projecting from one side of which are bearings 41, which received the shaft portion 42 of the angularly bent brace 43. The brace is preferably provided with the usual handles 44 and 45 by which the same may be operated to rotate the bar 42 about its axis. The socket member 36 is retained in the casing 40 by means of a cover-plate 46 having a circular opening therethrough which fits the upper boss 39. The cover-plate 46 may be secured in position in any suitable manner, as by means of the screws 47. The portion of the shaft 42 between the bearings 41 carries a worm 48 which meshes with the teeth 38 of the socket member 36. The operation of the wrench will now be understood. The wrench is applied by sliding the socket over the flange 35, as shown in Fig. 8, and then rotating the worm 48 by means of the brace. The rotation of the worm will first turn the socket member 36 into the position shown in Figs. 7 and 9, which will prevent the end of the wrench from dropping off the head of the stud. Further rotation of the brace will rotate the stud into operative or inoperative position, depending upon the direction of rotation of the wrench. The wrench is especially adapted for operating radial studs of the nature shown, as it may be operated from the side of the wheel in a very convenient and rapid manner. It also enables the radial studs to be forced out with great power. The forcing out of the radial studs causes the tapered ends of the same to engage the sockets in the under-surface of the rim, the tapered shape of the ends of the studs acting to insure accurate alinement of the rim upon the wheel felly. Further rotation of the studs forces the bearing surfaces of the rim away from the bearing surfaces of the felly band adjacent to the studs, thus distorting the rim slightly out of true circular configuration and drawing the portions of the rim between adjacent studs into close contact with the bearing surface of the felly band. The rim is thus caused to grip the wheel throughout the greater part of its periphery and a very solid bearing of the rim upon the wheel is obtained. The distortion of the rim is not sufficient to affect the running qualities of the wheel.

For preventing accidental rotation of the studs, I may use any suitable means, for example, spiral spring lock washers 49. These lock washers may be inserted in the holes in the felly through which the studs pass, one end of the lock washer bearing against the shoulder 50 formed by the end of the main body of the stud, while the other end of the lock washer rests upon the surface of the boss 51 projecting from the plate 27 and received in the end of the opening through the felly. By making the lock washer of a spring of several convolutions, it will follow the shoulder 50 throughout the travel of the radial stud and will thus serve to lock the stud against accidental displacement when in any position. The lock washer, owing to its position in the hole in the felly, is protected from injury and concealed from view so that the neat appearance of the wheel is not detracted from.

Either in addition to the lock washers 49, or in place of the same, I may use lock nuts 52 screwing on the stems of the studs. The nuts 52 are preferably used whether the lock washers 49 are used or not, as in addition to their function as lock nuts, they serve to limit the outward radial movement of the studs. The lock nuts preferably fit the screw-threaded stems of the studs somewhat tightly, so that they will normally remain stationary upon such stems. They thus serve to limit the outward movement of the studs when the latter are operated, by means of the wrench, and thus prevent one stud from being forced out farther than the others, which would result in mounting the rim eccentrically upon the wheel. The nuts 52, if required to be loosened or adjusted in position upon the stems of the studs, may be operated by an ordinary wrench, or the wrench illustrated may be used to operate the same by being lifted from the head 33 of one of the studs and engaged with the nut 52 of the stud. The nut and head are preferably made of the same configuration, so that the wrench may be used in this manner.

In Fig. 11 I have illustrated a modified form of my invention particularly adapted to a wire wheel or other wheel having a metallic channel in place of a wooden felly and its metallic felly band. As shown in this figure, 53 is the channel-shaped metallic fixed rim corresponding to the felly 2 with its felly band shown in the structure set forth in Fig. 5, having flanges 54 and 55 at the edges thereof, the flange 54 having a greater peripheral diameter than the flange 55. The edges of these flanges form bearing surfaces of different diameters upon which seats the tire-carrying rim. 56 is the tire-carrying rim which may be of any suitable construction, it preferably comprising a transversely split rim base having endless tire-retaining flanges 11. The rim base has a shallow depression 57 rolled therein at one side, the outside of the depressed portion forming a bearing surface adapted to engage the bearing surface formed by the periphery of the flange 54. At the other side of the rim base is formed a deeper depression 58, in one wall of which is rolled an offset 59. The horizontal wall 60 of this offset forms a seat adapted to engage the periphery of the flange 55, while the vertical wall 61 of the offset engages the side of the flange 55 and serves to limit the lateral movement of the rim and thus prevent it from slipping entirely over the wheel while being applied. The rim base has a depression therein preferably fitted with a wear plate 30, as above described. 62 is one of the radial studs for securing the rim to the wheel, this stud being provided with a head 63 having a flange 35 for the same purpose as the flange 35 already described. The fixed rim 53 has a series of bosses 64 preferably formed integral therewith, these bosses being internally threaded to receive the screw-threaded studs 62. For preventing the accidental rotation of the studs, lock washers 65 may be inserted between the heads of the studs and the ends of the bosses 64, if desired. The operation of the studs in securing the rim upon the wheel is the same as that of the studs previously described.

Having thus described certain preferred embodiments of my invention, but without desiring to limit myself to the details shown and described any further than as specified in some of the more limited claims hereunto appended, I claim:

1. A removable tire-carrying rim for vehicle wheels having sockets pressed therein at intervals, and wear plates conforming to said sockets and secured to the under-surface of the rim.

2. The combination with a vehicle wheel of a tire-carrying rim having rounded sockets pressed in the bottom thereof, and means for securing said rim upon said wheel comprising radially movable studs carried by the wheel, said studs having concave tapered ends entering the sockets in the rim, the extreme ends of said studs being flattened so as to provide a clearance between said ends and the rounded bottoms of the sockets in the rim.

3. The combination with a vehicle wheel of a tire-carrying rim removably mounted thereon and having sockets pressed therein, wear plates secured to the under-surface of the rim and conforming to said sockets, and means for securing the rim upon the wheel comprising radial studs carried by the wheel having tapered ends engaging said wear plates.

4. The combination with a vehicle wheel of a tire-carrying rim removably mounted thereon, and means for securing the rim upon the wheel comprising plates having integral prongs turned up from the ends thereof, said prongs securing the plates to the under-surface of the felly of the wheel, said plates having screw-threaded openings therethrough, and studs sliding in radial holes through the felly of the wheel, said studs having screw-threaded stems passing through the screw-threaded holes in said plates, the ends of said studs engaging the under-surface of said rim.

5. In a vehicle wheel, in combination, a felly, a metallic felly-band mounted thereon, a movable tire-carrying rim mounted on said felly band, and means for securing said rim in position comprising plates having integral prongs turned up therefrom, said prongs passing radially through the felly and felly band and being riveted to said felly band, said plates having screw-threaded openings therethrough, and radial studs mounted in holes in the felly, said studs having screw-threaded stems passing through the screw-threaded holes in said plates, the ends of said studs engaging the undersurface of the rim.

6. A felly plate for vehicle wheels having wooden fellies and metallic felly bands, comprising a body portion adapted to fit the under-side of the felly, said body portion having integral prongs turned up therefrom, said prongs passing through holes in the felly and felly band and being riveted to the latter.

7. The combination with a vehicle wheel having a felly with radial holes therethrough of a removable tire-carrying rim mounted upon said wheel, and means for securing the rim upon the wheel comprising plates secured to the under-side of the felly of the wheel over the ends of the radial holes therethrough, said plates having screw-threaded holes therethrough alined with the holes through the felly, but of less diameter, studs having body portions sliding in the holes through the felly, and threaded stems of reduced diameter screwing through the holes in the plates, the ends of said studs adapted to engage the under-surface of the rim, the ends of the threaded stems of said studs being formed for engagement by a wrench or the like, and spring lock washers mounted in the holes through the felly and surrounding the stems of said studs, the ends of said lock washers engaging the plates secured to the felly and the shoulders formed by the ends of the body portions of the studs, respectively.

8. The combination with a vehicle wheel of a tire-carrying rim removably mounted thereon, and means for securing said rim upon said wheel comprising studs passing radially through the felly of the wheel and engaging the under-surface of the rim, the ends of said studs being provided with faceted heads having narrow flanges of the same outline as the heads at the lower ends of the latter.

9. The combination with a vehicle wheel of a tire-carrying rim removably mounted thereon, and means for securing the rim upon the wheel comprising a stud passing radially through the felly of the wheel and adapted to engage the under-surface of the rim, said stud having a flanged faceted head adapted to be engaged by the socket of a brace wrench operable from the side of the wheel and substantially at right angles to the plane thereof.

10. The combination with a vehicle wheel of a tire-carrying rim having sockets pressed therein, and means for securing said rim upon said wheel comprising radially movable studs carried by the wheel, said studs having ends entering the sockets in the rim, said ends being shaped to provide a clearance therebetween and the bottoms of said sockets.

11. The combination with a vehicle wheel of a tire-carrying rim removably mounted thereon, and means for securing the rim upon the wheel comprising plates having members thereon adapted to pass through holes in the felly of the wheel, said plates being adapted to engage the ends of studs passing through the felly, the outer ends of said studs engaging the under-surface of said rim.

12. The combination with a vehicle wheel having a felly with radial holes therethrough of a removable tire-carrying rim mounted upon said wheel and means for securing the rim upon the wheel comprising plates secured to the under-side of the felly of the wheel over the ends of the radial holes therethrough, said plates being provided with screw-threaded holes therethrough alined with the holes through the felly but of less diameter, and studs having body portions sliding in the holes through the felly and threaded stems of reduced diameter screwing through the holes in the plates, the ends of said studs adapted to engage the under-surface of the rim, and the ends of the threaded stems of said studs being formed for engagement by a wrench or the like.

JAMES H. WAGENHORST.

Witnesses:
SEWARD DAVIS,
EDMUND QUINCY MOSES.